United States Patent [19]
Zweifel

[11] Patent Number: 6,160,498
[45] Date of Patent: Dec. 12, 2000

[54] AIRCRAFT TURBULENCE ENCOUNTER REPORTING SYSTEM

[75] Inventor: Terry L. Zweifel, Phoenix, Ariz.

[73] Assignee: Honeywell International Inc., Morristown, N.J.

[21] Appl. No.: 09/209,168

[22] Filed: Dec. 10, 1998

[51] Int. Cl.[7] .............................................. G08B 23/00
[52] U.S. Cl. ...................................... 340/968; 340/949
[58] Field of Search ................................. 340/968, 949; 701/14; 73/170.02

[56] References Cited

U.S. PATENT DOCUMENTS

| | | | |
|---|---|---|---|
| 3,272,973 | 9/1966 | McCready, Jr. | 235/151.3 |
| 3,387,120 | 6/1968 | Funk et al. | 235/150.2 |
| 3,733,424 | 5/1973 | Pitts et al. | 73/88.5 R |
| 3,979,579 | 9/1976 | Kleinpeter | 235/150.2 |
| 4,031,366 | 6/1977 | Hartung | 235/151.3 |
| 4,079,905 | 3/1978 | Greene | 244/191 |
| 4,336,595 | 6/1982 | Adams et al. | 364/508 |
| 4,763,266 | 8/1988 | Schultz et al. | 340/968 |
| 4,855,738 | 8/1989 | Greene | 340/968 |
| 5,053,767 | 10/1991 | Zweifel et al. | 340/968 |
| 5,119,091 | 6/1992 | Zweifel | 340/968 |
| 5,262,782 | 11/1993 | Rubin et al. | 340/949 |
| 5,383,133 | 1/1995 | Staple | 364/508 |
| 5,493,293 | 2/1996 | Hansen et al. | 340/968 |
| 5,511,430 | 4/1996 | Delest et al. | 73/802 |
| 5,541,591 | 7/1996 | Bush | 340/968 |
| 5,552,987 | 9/1996 | Barger et al. | 364/424.06 |
| 5,657,009 | 8/1997 | Gordon | 340/968 |

*Primary Examiner*—Daniel J. Wu
*Assistant Examiner*—John Tweel, Jr.

[57] ABSTRACT

Disclosed is a method and means for qualifying, quantifying and reporting aircraft turbulence encounters. The preferred embodiment provides an indirect method of measuring turbulence based upon the implementation of the well known equation:

$$V_{ground} = V_{air} + V_{wind}.$$

Qualification of the turbulence encounter is implemented with a filter and quantification of the turbulence encounter is implemented with analog to digital conversion. Thereafter, a transmitter broadcasts the occurrence of the turbulence encounter to remote receivers tuned to receive the transmission.

9 Claims, 2 Drawing Sheets

6,160,498

AIRCRAFT TURBULENCE ENCOUNTER REPORTING SYSTEM

FIELD OF THE INVENTION

The current invention provides a consistent and automatic system for detecting, quantifying, and reporting aircraft turbulence encounters. More specifically, the system according to the present invention uses currently available data to detect a turbulence encounter, then quantify the magnitude of the encounter, and report pertinent encounter information to a remote site.

BACKGROUND AND RELATED ART

Atmospheric turbulence is a phenomenon that is difficult to predict and can significantly effect day-to-day airline operations. Passenger safety and structural fatigue life span of aircraft are most affected by aircraft turbulence encounters. Currently, most encountered turbulence reports depend on a loosely organized subjective reporting system by the flight crews of the aircraft. The magnitude of the turbulence encounter tends to be a non-empirical or subjective assessment by the flight crew. Thus, the same magnitude turbulence may be report as either "severe", "moderate", or "mild", depending on which flight crew experiences the turbulence. Moreover, since local flights, which may be affected by the turbulence, gain no real information, other than turbulence was encountered, they cannot easily determine whether to avoid the turbulence or fly through it.

Thus, there is a need for a system that methodically measures and classifies turbulence in an objective manner. Moreover, there is a further need for a system that reports the systematically measured and classified turbulence to interested parties, such as various ground controls and nearby aircraft.

SUMMARY OF THE INVENTION

A primary object of the invention is to provide an aircraft turbulence encounter system having automatic recordation and reporting of the turbulence event. A further object of the present invention is to quantify and report the magnitude, duration as well as the location of the turbulence.

The novel features which are characteristic of the invention, both as to structure and method of operating thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

$$V'_{wind} = (a_{Long} - \Theta) - V'_{air}.$$

Figure 2:
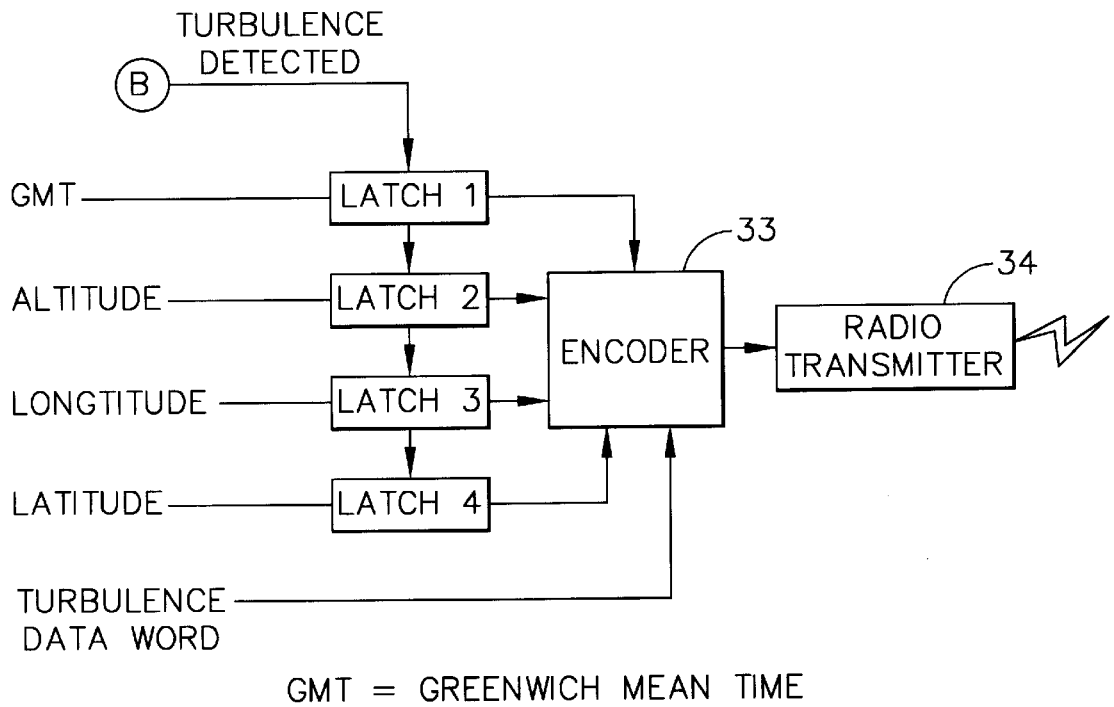

FIG. 2 is a preferred method for encoding additional information to the Turbulence Data Word.

Figure 3:
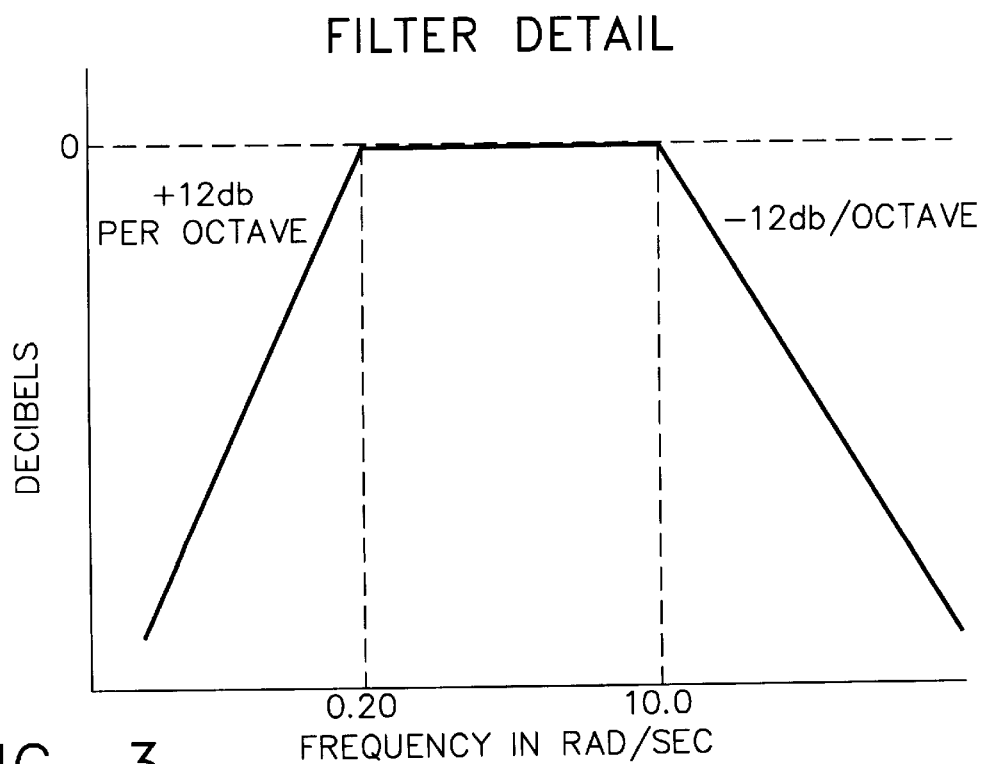

FIG. 3 is a depiction of the filter block frequency response, FILTER.

DETAILED DESCRIPTION PREFERRED EMBODIMENTS

The present invention, an Aircraft Turbulence Encounter Reporting System 1, is useful for methodically measuring and classifying turbulence encounters in an objective manner. Moreover, the present invention is further useful for reporting the systematically measured and classified turbulence to interested parties, such as various ground controls and nearby aircraft.

Turbulence may be defined as the rapid time rate of change of the wind velocity relative to the ground. It is well known in the industry that:

$$V_{ground} = V_{air} + V_{wind}, \quad (1)$$

where $V_{ground}$ is the velocity of the aircraft relative to the ground, $V_{air}$ is the velocity of the air mass relative to the aircraft, or true air speed, and $V_{wind}$ is the velocity of the air mass relative to the ground. Taking the mathematical derivative of equation (1) with respect to time give us the time rate of change of the various velocities:

$$V'_{ground} = V'_{air} + V'_{wind}, \quad (2)$$

where the "prime" above each term is understood to represent the time derivative, d/dt, in the conventional manner.

By rearranging the above equation, we obtain our turbulence measure $V'_{wind}$:

$$V'_{wind} = V'_{ground} - V'_{air}. \quad (3)$$

The parameter $V'_{ground}$ can be indirectly obtained from a longitudinal accelerometer, $a_{Long}$ mounted onboard the aircraft. In the present invention this is done by subtracting a pitch angle parameter 102, representing the aircraft's actual pitch angle $\Theta$, from a longitudinal acceleration parameter 101, available from said longitudinal accelerometer. This correction is necessary since the accelerometer 100 is essentially a pendulum device that measures the pendulum angle relative to the aircraft's fuselage centerline. Consequently, an uncorrected accelerometer 100 will not only measure the aircraft's acceleration relative to the ground but also will output a signal proportional to the operative result of a sine function operation upon the aircraft's pitch angle. By subtracting out the effect of the pitch angle, the accelerometer 100 output is thereby corrected to be proportional only to the aircraft's acceleration relative to the ground, or inertial space.

The term $V'_{air}$ is easily obtained from existing aircraft instrumentation by simply taking the time rate of change of the aircraft's true airspeed 13 in the conventional and well-known manner and yielding the following equation:

$$V'_{wind} = (a_{Long} - \Theta) - V'_{air}. \quad (4)$$

Therefore, by using the foregoing equation, an indirect measurement of the time rate of change of the wind, $V'_{wind}$, can be made. As discussed above, this time rate of change of the wind is a direct measurement of turbulence.

Figure 1:
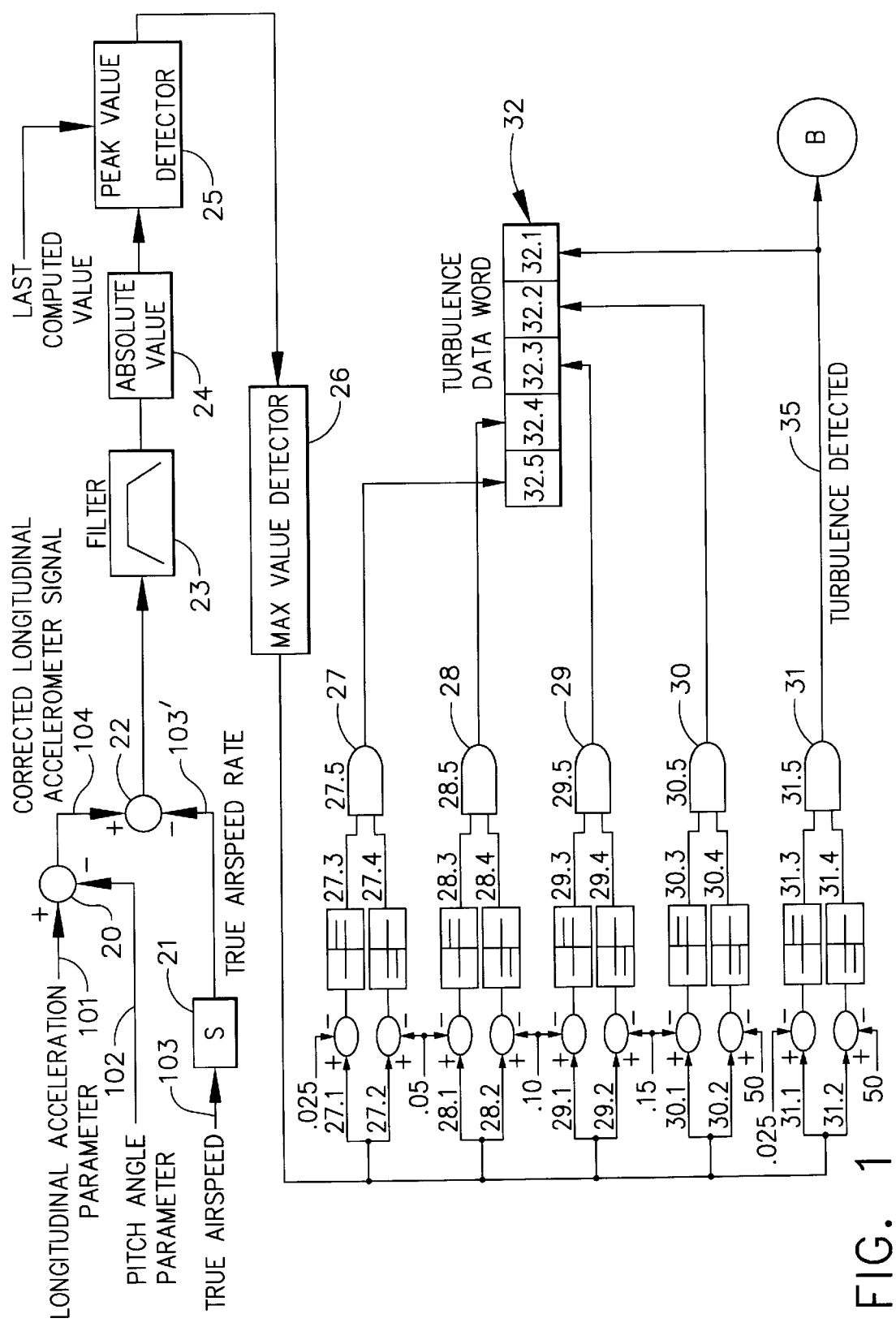
FIG. 1 is a preferred method for implementing the solution of the equation.

Preferably, the method for implementing the solution of the above equation is illustrated in FIG. 1. Here, the longitudinal accelerometer parameter 101, $a_{Long}$, is fed to a summing junction 20 where the aircraft's pitch angle parameter 102, $\Theta$, is subtracted. For small pitch angles, typically those experienced by today's jet airliners, the pitch angle, $\Theta$, measured in radians, is well known to be a reasonably accurate approximation to the sine of the pitch angle, sine $\Theta$.

Simultaneous with the above action, the aircraft's true airspeed parameter 103, measured in g-seconds, is supplied to a rate-taker 21, represented on FIG. 1 by the block with the "s" in it, "s" representing the Laplace transform of the time derivative operation. Consequently, the output of the "s" block is a parameter proportional to the time rate of change of the aircraft's true airspeed 15', $V'_{air}$.

The corrected longitudinal accelerometer signal 104, ($a_{Long}$–Θ), is then supplied to a second summing junction 22 that then subtracts the true airspeed rate 103', $V'_{air}$. Thus, the output of the summing junction 22 is a signal representative of $V'_{wind}$ 12', or turbulence, according to equation 4.

Research has shown that only certain frequencies of turbulence are of concern. These frequencies were determined by NASA to be within the range of 0.20 radians per second to 10.0 radians per second. Consequently, it is necessary to filter out those frequencies that lie outside of this range. This is the purpose of the filter block23, FILTER, shown in FIG. 1, and in detail in FIG. 3.

The filter 23, FILTER, works in a conventional manner such that frequencies below 0.20 radians per second are attenuated at a rate of 12 decibels per octave; similarly, those frequencies above 20.0 radians per second are also attenuated at the 12 decibels per octave. In this manner, only those frequencies of interest are supplied as an output of the filter block 23, FILTER.

To aid in simplifying the computations, the output of the filter block 23, FILTER, is supplied to a conventional absolute value operator 24, or rectifier. According to convention, the absolute value operator 24, or rectifier leaves positive input signals unchanged while changing the algebraic signal of negative input signals.

The output of the absolute value operator 24, or rectifier is then supplied to a Peak Value Detector 25 that compares the rectified output with the previous output value. By using these two values, the Peak Value Detector 25 can determine the maximum amplitude of a series of supplied values in a conventional and well-known manner. If a new output is greater than the previous output, the Peak Value Detector 25 sends the output to a Max Value Detector 26.

The Max Value Detector 26 works in the conventional manner well known in the industry. It compares the value supplied by the peak value detector 25 with other values that have been previously input and latches and outputs only the maximum of these. Thus, the output of the Max Value Detector 26 represents the maximum signal that has been seen during the computations and is therefore a measure of the maximum value of turbulence that has been encountered.

The output of the Max Value Detector 26 is supplied to a series of five comparison circuits, 27–31, that determine the magnitude range of the maximum detected turbulence signal. Each of these comparison circuits, 2731, works identically with the only difference being the reference values supplied to determine the range of the maximum turbulence. For convenience, only the actions of one such circuit will be described, it being understood that each works in an similar fashion.

Referring to the top-most comparison circuit 27 in FIG. 1, the maximum value of detected turbulence is simultaneously supplied to first and second summing junctions, 27.1 and 27.2, respectively. In said first junction 27.1, a reference value of 0.025 g is subtracted from the maximum value of detected turbulence and the output of said first summing junction 27.1 is supplied to a first polarity comparator 27.3. The polarity comparator 27.3 works in such fashion as to output a logical "1" if said first summing junction 27.3 output signal is positive, i.e., if the maximum value of turbulence is greater than 0.025 g, and a logical "0" if the result is negative. The output of the polarity comparator 27.3 is then supplied as one input to a conventional logical AND gate 27.5.

In said second summing junction 27.2, a reference value of 0.05 g is subtracted from the maximum value detector 26 output via said second summing junction 27.2. The output of said second summing junction 27.2 is then supplied to second polarity comparator 27.4 which acts in such a way as to output a logical "1" if the signal is negative while outputting a logical "0" if a positive result is obtained. The output of the second polarity comparator 27.4 is supplied as the second input to the conventional AND gate 27.5 mentioned above.

The AND gate 27.5 works in such a fashion as to output a logical "1" if both its inputs are a logical "1" and outputs a logical "0" if one or both of the input signals is a logical "0". In this manner, a logical "1" at the output of the AND gate 27.5 signifies that the output of the maximum value detector 26 falls within the range of 0.025 g to 0.05 g, while a logical "0" indicates that the maximum value of encountered turbulence does not fall within this range.

All of the comparison circuits, 27–31, shown on FIG. 1 work in the manner just described with only the reference values changing in order to determine the range of the maximum value of turbulence encountered. The comparison circuit 31 at the bottom of the FIG. 1 is used solely to determine if any turbulence has been encountered. That is, the comparison circuit 31 will output a logical "1" if the maximum value detector 26 output is between 0.025 g and 50.0 g. Consequently, any signal above 0.025 g will cause the Turbulence Detected signal to be a logical "1"; conversely, any signal below 0.025 g will not be considered as a Turbulence Detected occurrence.

The outputs of the comparison circuits, 27–31, are supplied written to a Turbulence Detection Word, or Turbulence Data Word 32, in a manner well known in the industry. The Turbulence Detection Word consists of five memory locations that are set by the outputs of the AND gates, 27.5–31.5, of the comparison circuits, 27–31. By this action, bit 1 32.1 of the Turbulence Detection Word 32 indicates that turbulence has been encountered; bit 2 32.2 indicates that the maximum value of the measured turbulence fell between 0.15 g and 50.0 g, indicating Extreme Turbulence; bit 3 32.3 indicates a value between 0.10 g and 0.15 g, indicating Severe Turbulence; bit 4 32.4 corresponds to a value between 0.05 g and 0.10 g, indicating Moderate Turbulence; and bit 5 32.5 corresponds to a value between 0.05 g and 0.025 g, indicating Light Turbulence.

Simultaneous with the above-described action, the Turbulence Detection Word 32 is supplied to an encoder 33 that includes variety of latched data, shown in FIG. 2, whose action will now be described.

Signals representing Greenwich Mean Time (GMT), longitude and latitude are continuously supplied as inputs to first, third, and fourth latching circuits, LATCH 1, LATCH 3, and LATCH 4, as shown on FIG. 2. These signals may be derived from the aircraft's Flight Management System, Performance Management System, Global Positioning System, or other system on the aircraft capable of supplying such signals. Additionally, the aircraft's barometric altitude, derived from the aircraft's barometric altitude system is supplied to a second latching circuit, LATCH 2.

The four latches shown operate in such a fashion as to output a logical "0" in the absence of a Turbulence Detected signal, whose derivation was discussed in conjunction with FIG. 1. If turbulence has been detected, the Turbulence Detected signal will be a logical "1" and is supplied to each of the four latches shown on FIG. 2. A Turbulence Detected signal that is logical "1" acts in such a way as to cause the latches to store the value at the input at the time the signal becomes a logical "1". The outputs of the latches are supplied to the Encoder circuit 33.

The action of the Encoder circuit 33 is such that the outputs of the latches are stored in any one of the industry-accepted standards, such as the ARINC 429 standard used throughout the industry for the formatting of data. Simultaneously, the Turbulence Detection Word 32, previously discussed, is also supplied to the Encoder circuit 33 for formatting into an industry-accepted standard. The output of the Encoder circuit 33 therefore is a digital word which contains the information as to the time of the turbulence encounter (GMT), the location of the encounter (longitude and latitude), the altitude of the encounter (barometric altitude), and the magnitude of range of the encountered turbulence stored in the Turbulence Detection Word 32.

The Encoder circuit 33 output is then coupled to a conventional radio transmitter 34 which then transmits the Encoder circuit 33 output to any compatible radio receiver, such as those used by Air Traffic Control or the airline weather information center. The received signal can then be retransmitted to other aircraft in the area to be used in avoiding turbulence encounters. Alternately, the transmitted radio signal could also be received directly by other aircraft as an aid to the flight crews to avoid turbulence encounters. The radio transmission of the encoder circuit 33 output may be either automatic, (e.g., a transmission will occur when the Turbulence Detected signal becomes a logical "1") or manual (e.g., transmitted by the flight crew through the appropriate methodology consistent with their radio transmitter).

Following transmission of the Encoder circuit 33 output the Turbulence Data Word 32, Turbulence Detected signal 35, Peak Value Detector 25, and Max Value Detector 26 may all be reset to zero to clear the system and await a subsequent turbulence encounter.

It should be understood that the foregoing specific components illustrated and described in the specification are not to be interpreted as limiting the scope of the invention. The breadth and depth of the overall inventive concept are deemed to be limited only by the following appended claims.

What is claimed is:

1. A method for detecting, classifying, and transmitting turbulence encountered by an aircraft comprising the steps of:
   a. measuring magnitude values for turbulence encountered by an aircraft;
   b. classifying the measured magnitude value according to a predetermined classification scheme;
   c. electronically storing the classification of the measured magnitude value into a turbulence detection word 32;
   d. passing the stored turbulence detection word 32 to an encoder that attaches additional data to the turbulence detection word to create a turbulence data message; and
   e. transmitting the data message to a receiver remote from the aircraft;
   whereby the remote receiver acquires said information concerning the magnitude, time, location, and altitude of the turbulence encounter.

2. The method according to claim 1 wherein step of measuring magnitude values for turbulence encountered by an aircraft further comprises the steps of:
   a. coupling a longitudinal accelerometer parameter, $a_{Long}$, to a summing junction where the aircraft's pitch angle parameter, $\Theta$, is subtracted, thereby creating a value for a corrected longitudinal accelerometer signal, $(a_{Long}-\Theta)$;
   b. coupling the aircraft's true airspeed signal, measured in-seconds, to a rate-taker creating an output signal that is proportional to the time rate of change of the aircraft's true airspeed, $V'_{air}$;
   c. supplying the corrected longitudinal accelerometer signal, $(a_{Long}-\Theta)$, to a second summing junction that then subtracts the true airspeed, $V'_{air}$ creating an output from the summing junction that represents a turbulence signal, $V'_{wind}$;
   d. filtering the turbulence signal, $V'_{wind}$, such that frequencies below 0.20 radians per second are attenuated at a rate of 12 decibels per octave; similarly, those frequencies above 20.0 radians per second are also attenuated at the 12 decibels per octave rate, thereby only those frequencies of interest are supplied as an output of the filter;
   e. rectifying the output of the filter with a absolute value operator, or rectifier to provide all positive output signals;
   f. coupling the output of the absolute value operator, or rectifier to a Peak Value Detector, said Peak Value Detector having an output, that compares the rectified output with a previous output value, thereby determining the maximum amplitude of a series of supplied values;
   g. supplying the output of the Peak Value Detector to a Max Value Detector if a new peak detected;
   h. latching the maximum value for detected peaks within the Max Value Detector and outputting the maximum signal that has been detected during the computations, whereby this maximum value represents a measure of the maximum value of turbulence that has been encountered.

3. The method according to claim 2 wherein the step of classifying the measured magnitude value according to a predetermined classification scheme further comprises the step of supplying the output of the Max Value Detector to a series of at least five comparison circuits that classify the magnitude range of the maximum detected turbulence signal, wherein the predetermined classification scheme is Extreme Turbulence falls between 0.15 g and 50.0 g; Severe Turbulence falls between 0.10 g and 0.15 g; Moderate Turbulence falls between 0.05 g and 0.10 g; and, and Light Turbulence falls between 0.05 g and 0.025 g.

4. The method according to claim 3 wherein the step of classifying the measured magnitude value according to a predetermined classification scheme further comprises the step of electronically storing the outputs of the at least five comparison circuits by placing the values of the comparison circuits into the Turbulence Detection Word such that bit 1 of the Turbulence Detection Word 32 indicates that turbulence has been encountered; bit 2 indicates that the maximum value of the measured turbulence fell between 0.15 g and 50.0 g, indicating Extreme Turbulence; bit 3 indicates a value between 0.10 g and 0.15 g, indicating Severe Turbulence; bit 4 corresponds to a value between 0.05 g and 0.10 g, indicating Moderate Turbulence; and bit 5 corresponds to a value between 0.05 g and 0.025 g, indicating Light Turbulence.

5. The method according to claim 4 wherein the step of passing the stored Turbulence Detection Word to an encoder that attaches additional data to the Turbulence Detection Word to create a data message further comprises the steps of:
   a. supping the Turbulence Detection Word to an encoder that includes variety of latched data;
   b. attaching the variety of latched data to the Turbulence Detection Word, wherein the variety of data include, but are not limited to, values representing Greenwich Mean Time, longitude and latitude, and the aircraft's barometric altitude, as derived from the aircraft's barometric altitude system, thereby creating the turbulence data message.

6. The method according to claim 5 wherein the step of transmitting the data message to a party remote from the aircraft is an automatic transmission that occurs when the Turbulence Detected signal is indicated.

7. The method according to claim 4 further including the steps of resetting to zero the Turbulence Detection Word, Turbulence Detected signal, Peak Value Detector, and Max Value Detector thereby clearing the system for a subsequent turbulence encounter.

8. A system for detecting, classifying, and transmitting turbulence encountered by an aircraft comprising:
   a. a means of generating a longitudinal acceleration parameter, and
   b. a means of generating a pitch angle parameter, and
   c. a summation function wherein said pitch angle parameter and said longitudinal acceleration parameter are coupled to said summation function and said pitch angle parameter is subtracted from said longitudinal acceleration parameter, said summation function being further coupled to,
   d. a filter that allows only those turbulence frequencies to pass that are of interest to the present invention and attenuates frequencies of no interest to the present invention, said filter being further coupled to,
   e. an absolute value operator, or rectifier, that provides only positive polarity outputs, said absolute value operator, or rectifier being also coupled to,
   f. a peak value detector that compares subsequent values from said absolute value operator, or rectifier, and supplies the greater of said subsequent values to,
   g. a maxi value detector, that compares subsequent values supplied from said peak value detector and stores and couples the greater of said subsequent values to,
   h. a series of comparison circuits that operate to quantify the magnitude of said turbulence encountered, said series of comparison circuits each being coupled to a memory location representative of a bit of,
   i. a turbulence data word that is coupled to,
   j. at least four latches, said latches being further coupled to,
   k. an encoder circuit that encodes said turbulence data word, said encoder further coupled to,
   l. a radio transmitter, that transmits said encoded turbulence data word to,
   m. a remote receiver,
   whereby the remote receiver acquires said information concerning the magnitude, time, location, and altitude of said turbulence encountered.

9. The system in claim 8 wherein each of said series of comparison circuits that operate to quantify the magnitude of said turbulence encountered further comprise;
   a. a first summing junction coupled to
   b. a first polarity comparator and
   c. a second summation coupled to,
   d. a second polarity comparator, said first polarity comparator and said second said polarity comparator each further coupled to,
   e. an AND gate further coupled to
   f. said memory location.

* * * * *